(12) United States Patent
Abrishamkar et al.

(10) Patent No.: US 7,366,137 B2
(45) Date of Patent: Apr. 29, 2008

(54) SIGNAL-TO-NOISE ESTIMATION IN WIRELESS COMMUNICATION DEVICES WITH RECEIVE DIVERSITY

(75) Inventors: Farrokh Abrishamkar, San Diego, CA (US); Brian Banister, San Diego, CA (US); Gilbert C. Sih, San Diego, CA (US); Thunyachate Ekvetchavit, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1005 days.

(21) Appl. No.: 10/448,815

(22) Filed: May 31, 2003

(65) Prior Publication Data

US 2004/0240419 A1 Dec. 2, 2004

(51) Int. Cl.
*H04Q 7/00* (2006.01)
(52) U.S. Cl. .................. 370/332; 370/342; 370/441; 455/135; 379/227
(58) Field of Classification Search .............. None
See application file for complete search history.

(56) References Cited

U.S. PATENT DOCUMENTS

| | | | | |
|---|---|---|---|---|
| 5,621,723 | A * | 4/1997 | Walton et al. ............... | 370/335 |
| 5,991,329 | A * | 11/1999 | Lomp et al. ................ | 375/130 |
| 6,075,974 | A * | 6/2000 | Saints et al. ................ | 455/69 |
| 6,154,659 | A * | 11/2000 | Jalali et al. ................. | 455/522 |
| 6,526,031 | B1 * | 2/2003 | Zaff et al. ................... | 370/335 |
| 6,542,483 | B1 * | 4/2003 | Dinc et al. ................... | 370/332 |
| 6,744,749 | B2 * | 6/2004 | Abrishamkar et al. ...... | 370/335 |
| 7,061,882 | B2 * | 6/2006 | Abrishamkar et al. ...... | 370/320 |
| 2002/0097782 | A1 * | 7/2002 | Pajukoski ................... | 375/147 |
| 2003/0058962 | A1 | 3/2003 | Baldwin | |
| 2004/0179496 | A1 * | 9/2004 | Abrishamkar et al. ...... | 370/335 |

FOREIGN PATENT DOCUMENTS

| WO | 0036760 A1 | 6/2000 |
|---|---|---|
| WO | 0223840 A | 3/2002 |

OTHER PUBLICATIONS

Dong Xiaojian et al., "A Novel Method of Channel Estimation for W-CDMA" Asia-Pacific Conference on Communications and Optoelectronics and Communications Conference. APCC/OECC. Proceedings. Conference Vitality to the New Century, XX, XX, Oct. 18, 1999, pp. 582-585, vol. 1.
International Search Report ISA EPO PCT/US2004/017162 Nov. 10, 2004.

* cited by examiner

*Primary Examiner*—Wing Chan
*Assistant Examiner*—Brian Roberts
(74) *Attorney, Agent, or Firm*—Kenneth K. Vu; Johnathan T. Velasco; Thomas R. Rouse

(57) ABSTRACT

This disclosure is directed to techniques for estimating signal-to-noise ratio (SNR) of signals received by a wireless communication device. The techniques take advantage of spatial receive diversity in a wireless communication device to achieve accurate estimates of SNR. In general, a spatial projection wiener filter function can be applied to incoming symbol estimates to support efficient computation of SNR. The estimated SNR can be used to produce power control commands for use in forward power control.

44 Claims, 10 Drawing Sheets

SIGNAL-TO-NOISE ESTIMATION IN WIRELESS COMMUNICATION DEVICES WITH RECEIVE DIVERSITY

BACKGROUND

1. Technical Field

The disclosure relates to wireless communication and, more particularly, techniques for signal-to-noise ratio estimation.

2. Related Art

A widely used technique for wireless communication is code division multiple access (CDMA) signal modulation. In a CDMA system, multiple communications are simultaneously transmitted between base stations and mobile subscriber units over a spread spectrum radio-frequency (RF) signal. In CDMA and other spread spectrum systems, maximizing system capacity and maintaining quality of service are paramount concerns. System capacity in a spread spectrum system can be maximized by carefully controlling the transmit power of each subscriber unit and base station in the system.

If a signal transmitted by a subscriber unit arrives at the base station at a power level that is too low, the bit-error-rate may be too high to permit effective communication with that subscriber unit, undermining quality of service. On the other hand, signals with power levels that are too high can interfere with communication between the base station and other subscriber units in the system, reducing system capacity. For this reason, to maintain system capacity and quality of service, it is desirable to monitor and control the level of transmit power of signals transmitted by base stations and subscriber units.

The subscriber units and base stations typically communicate with one another to control the transmit power of signals sent in the system. For example, to control the level of transmit power in a base station, the subscriber unit estimates the power of a signal received from the base station and transmits instructions, such as power control bits, to the base station via a control channel. The base station adjusts transmit power based on the power control bits transmitted from the subscriber unit.

The process for controlling base station transmit power is often referred to as forward power control (FPC). For effective forward power control, the subscriber unit estimates the signal-to-noise ratio of signals received from the base station. The signal-to-noise ratio is typically expressed as the ratio $E_b/N_t$, i.e., the ratio of signal energy per information-bit ($E_b$) to noise power spectral density ($N_t$).

SUMMARY

This disclosure is directed to techniques for estimating signal-to-noise ratio (SNR) of signals received by a wireless communication device. The techniques take advantage of spatial receive diversity in a wireless communication device to achieve accurate estimates of SNR. In general, a spatial projection wiener filter function can be applied to incoming symbol estimates to support efficient computation of SNR. The estimated SNR can be used to produce power control commands for use in forward power control.

In one embodiment, the disclosure provides a method comprising generating traffic and pilot symbol estimates for a received wireless signal based on spatial samples of the signal, scaling the traffic and pilot symbol estimates using a spatial projection wiener filter function; and estimating a signal-to-noise ratio based on the scaled traffic and pilot symbol estimates.

In another embodiment, the disclosure provides a wireless communication device configured to generate traffic and pilot symbol estimates for a received wireless signal based on spatial samples of the signal, scale the traffic and pilot symbol estimates using a spatial projection wiener filter function, and estimate a signal-to-noise ratio based on the scaled traffic and pilot symbol estimates.

In another embodiment, the disclosure provides a method comprising generating traffic and pilot symbol estimates for a received wireless signal, scaling the traffic and pilot symbol estimates using a spatial projection wiener filter function, and estimating a signal-to-noise ratio based on the scaled traffic and pilot symbol estimates.

In a further embodiment, the disclosure provides a wireless communication device configured to generate traffic and pilot symbol estimates for a received wireless signal, scale the traffic and pilot symbol estimates using a spatial projection wiener filter function, and estimate a signal-to-noise ratio based on the scaled traffic and pilot symbol estimates.

In other embodiments, this disclosure provides computer-readable media comprising instructions to cause a processor to implement aspects of the foregoing method and device. In particular, if implemented in software, techniques described herein may be implemented as program code that can be executed by a processor or DSP to carry out one of more of the techniques.

The details of one or more embodiments are set forth in the accompanying drawings and the description below. Other features, objects, and advantages will be apparent from the description and drawings, and from the claims.

DETAILED DESCRIPTION

Figure 1:
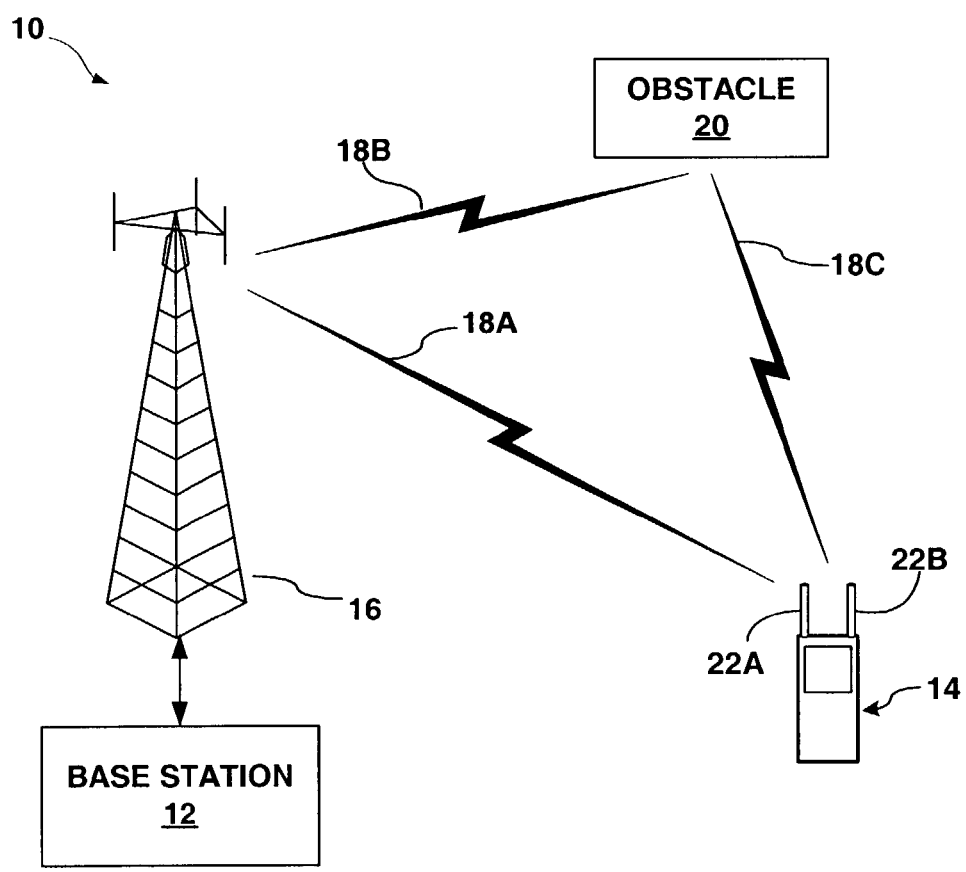
FIG. 1 is a block diagram illustrating a wireless communication system.

FIG. 1 is a block diagram illustrating a spread spectrum wireless communication system 10. System 10 may be designed to support one or more spread spectrum communication techniques, such as techniques conforming to any of the various CDMA standards, and including the WCDMA standard. For example, wireless communication system 10 may support one or more CDMA standards such as (1) the "TIA/EIA-95-B Mobile Station-Base Station Compatibility Standard for Dual-Mode Wideband Spread Spectrum Cellular System" (the IS-95 standard), (2) the "TIA/EIA-98-C Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the WCDMA standard), (4) the standard offered by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "C.S0024 CDMA2000 High Rate Packet Data Air Interface Specification" (the CDMA2000 standard), and (5) other standards.

As shown in FIG. 1, system 10 may include a base station 12 that transmits and receives wireless signals to and from a wireless communication device (WCD) 14 via base station antenna 16. The wireless signals may follow one or more paths 18A, 18B, 18C. WCD 14 may take the form of a mobile subscriber unit such as a cellular radiotelephone, a satellite radiotelephone, a PCMCIA card incorporated within a portable computer, a personal digital assistant (PDA) equipped with wireless communication capabilities, or the like. Base station 12 may include a base station controller that provides an interface between the base station and a public switched telephone network (PSTN), data network, or both.

Base station 12 may receive signals from WCD 14 via a first path 18A, as well as signals via a second path 18B, 18C caused by reflection of the signal from an obstacle 20. Obstacle 20 may be any structure proximate to WCD 14 such as a building, bridge, car, or even a person. The transmitted signals illustrate a multipath environment in which multiple received signals carry the same information, but may have different amplitudes, phases and time delays. Thus, the signals are instances of the same signal propagated along different physical paths 18 to base station 12 or WCD 14. The same signal propagated along different physical paths is referred to herein as a spatially diverse signal or a multipath signal.

WCD 14 and base station 12 use a feedback technique, often referred to as forward power control (FPC), to control the level of transmit power of the signals transmitted by the base station. To control the level of transmit power in base station 12, and thereby ensure signal quality without excessive transmit power, WCD 14 estimates the power of a signal received from the base station and generates power control commands. WCD 14 transmits the power control commands, e.g., as a pattern of power control bits, to base station 12 via a control channel in the uplink. The use of power control bits will be described herein for purposes of example.

Upon receipt of the power control bits from WCD 14, base station 12 interprets the power control bits and adjusts its transmit power so that the transmitted signals are received by WCD 14 at a more desirable power level. As further shown in FIG. 1, WCD 14 is equipped with two or more antennas 22A, 22B arranged for spatial diversity. In this manner, WCD 14 can be configured to estimate the power of the signal received from base station 12 using receive diversity. In particular, antennas 22A, 22B obtain spatially diverse samples of the signals transmitted by base station 12. WCD 14 then applies a set of signal processing techniques to the spatial samples from antennas 22A, 22B to produce an estimate of the signal-to-noise ratio of the transmission channel between base station 12 and the WCD. Based on the signal-to-noise ratio, WCD 14 generates power control commands for transmission to base station 12 for use in controlling the transmit power of the base station.

Figure 2:
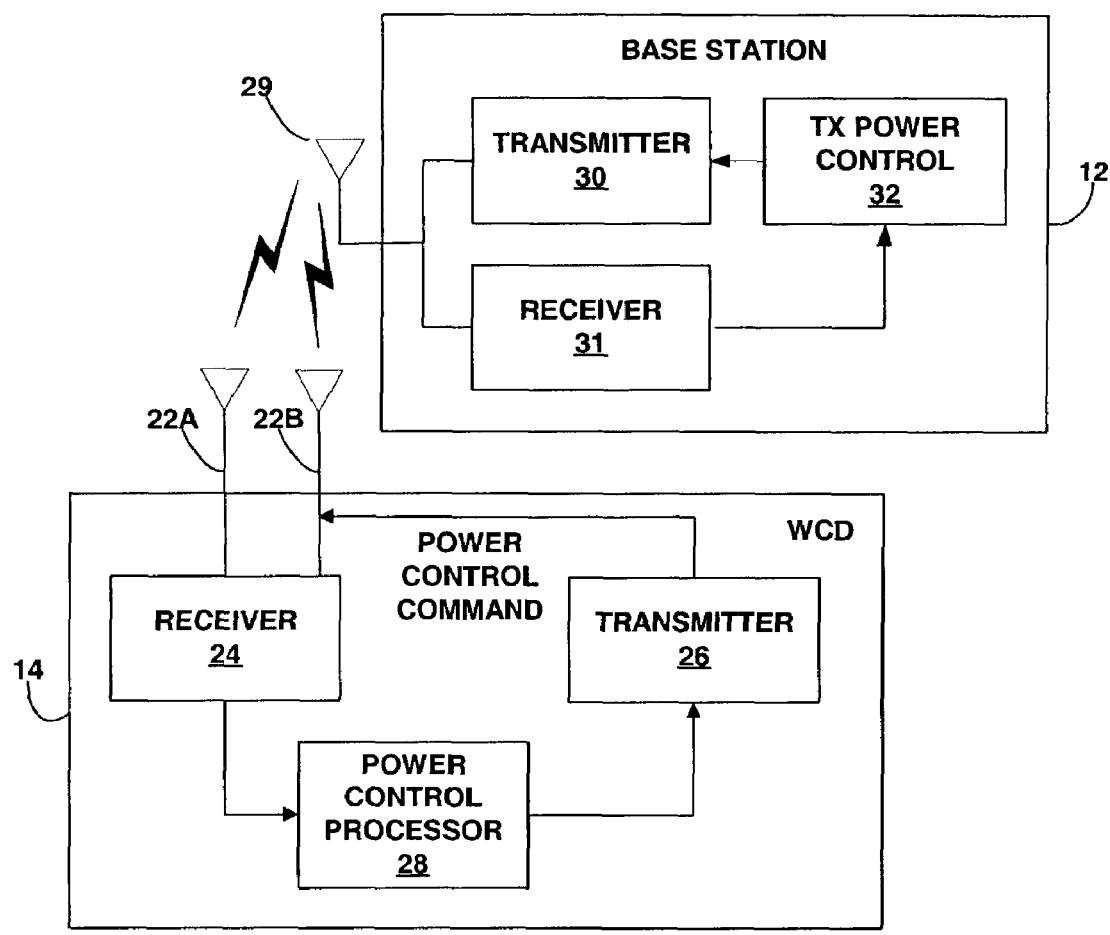
FIG. 2 is a block diagram generally illustrating the concept of forward power control in a wireless communication system using receive diversity.

FIG. 2 is a block diagram generally illustrating the concept of forward power control in wireless communication system 10 using receive diversity. As shown in FIG. 2, WCD 14 may includes diversity antennas 22A, 22B, a receiver 24, a transmitter 26, and a power control processor 28. Base station 12 includes an antenna 29, a transmitter 30, a receiver 31, and a transmit (TX) power control unit 32. Receiver 24 of WCD 14 receives spatial samples of a signal transmitted by antenna 29 via diversity antennas 22A, 22B. Power control processor 28 processes the spatial samples to estimate signal-to-noise ratio (SNR) of a channel between base station 12 and WCD 14. Based on the estimated SNR, power control processor 28 generates one or more power control commands, e.g., in the form of power control bits. Transmitter 26 of WCD 14 transmits the power control command to receiver 31 of base station 12. Transmit power control unit 32 processes the power control command to adjust and control the transmit power of transmitter 30. In this manner, more desirable transmit power levels can be achieved, thereby improving system capacity and quality of service (QoS).

Figure 3:
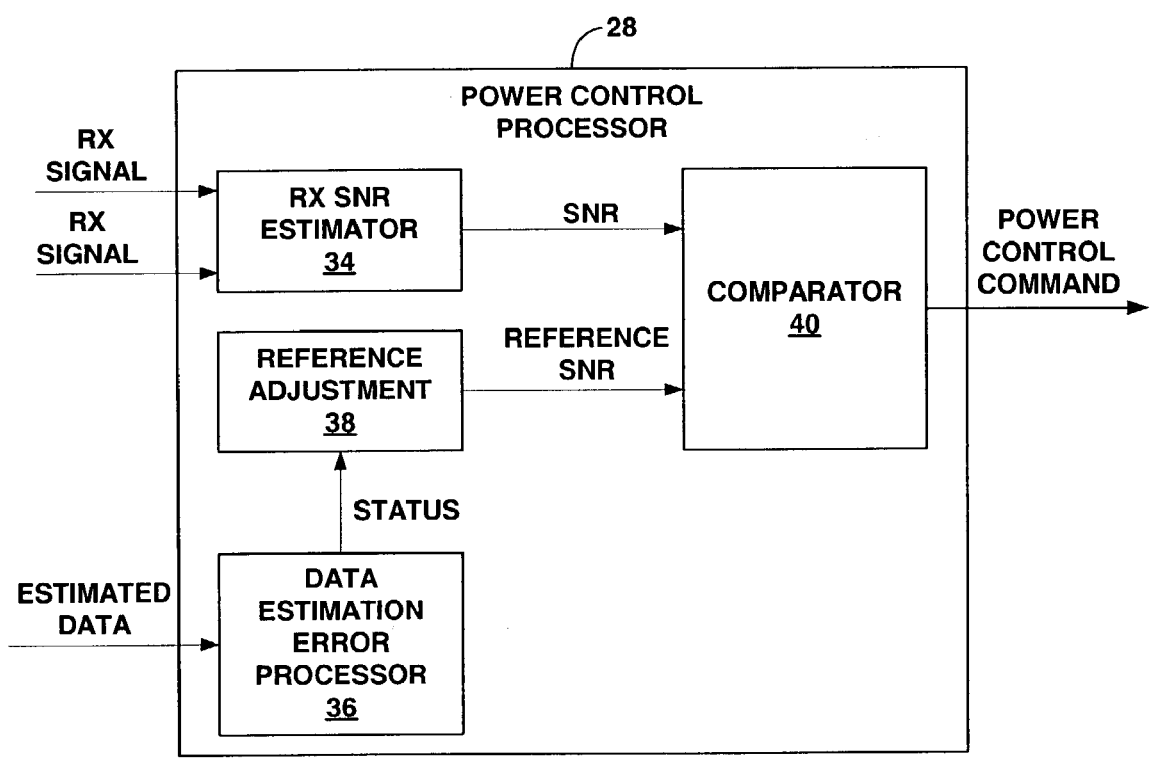
FIG. 3 is a block diagram illustrating a power control processor configured for use with receive diversity.

FIG. 3 is a block diagram illustrating a power control processor 28 configured for use in a spatially diverse environment. As shown in FIG. 3, power control processor 28 may include a receive (RX) SNR estimator unit 34, a data estimation processor 36, a reference adjustment unit 38 and a comparator 40. Power control processor 28, and the various functional units depicted in FIG. 3, may take the form of a microprocessor, digital signal processor (DSP), application specific integrated circuit (ASIC), field programmable gate array (FPGA), or other logic circuitry programmed or otherwise configured to operate as described herein. Accordingly, various components of power control processor 28 may take the form of programmable features executed by a common processor or discrete hardware units.

Receive SNR estimator 34 obtains spatial samples of a received signal (RX signal), and generates an SNR estimate (SNR). As will be described, receive SNR estimator 34 generates traffic and pilot symbol estimates for the received wireless signal based on the spatial samples of the signal. Pilot symbols generally refer to control symbols used to facilitate system synchronization, whereas traffic symbols generally refer to data carrying symbols. For example the traffic and pilot symbols may reside in different channels of a received signal. Receive SNR estimator 34 scales the traffic and pilot symbol estimates using a spatial projection wiener filter function to estimate the SNR. In this manner, receive SNR estimator 34 implements processing techniques that permit use of spatial diversity to achieve accurate estimates of signal-to-noise ratio. Receive SNR estimator 34 may use alternative filter functions.

Comparator 40 compares the estimated SNR generated by receive SNR estimator 34 to reference SNR. In this sense, receive SNR estimator 34 and comparator 40 form a unique "inner loop" for the power control scheme. Data estimation processor 36 and reference adjustment unit 38, in conjunction with comparator 40, form an "outer loop" of the power control scheme. In general, data estimation processor 36 processes estimated data symbols received by receiver 24 to assess error rate, and generates a status signal that instructs reference adjustment unit 38 to increase, decrease or maintain the existing reference SNR. In this manner, SNR adjustment unit 38 adjusts the reference SNR in response to changes in data integrity.

Comparator 40 generates a power control command based on a comparison of the SNR produced by receive SNR estimator 34 and the SNR reference produced by reference adjustment unit 38. If the SNR produced by receive SNR estimator 34 is less than the SNR reference, for example, comparator generates a power control command that instructs transmit power control unit 32 (FIG. 2) to increase transmit power in base station 12. Alternatively, if the SNR produced by receive SNR estimator 34 is greater than the SNR reference, comparator generates a power control command that instructs transmit power control unit 32 (FIG. 2) to decrease transmit power in base station 12. The power control command may take the form of an incremental "up/down" indication.

Figure 4:
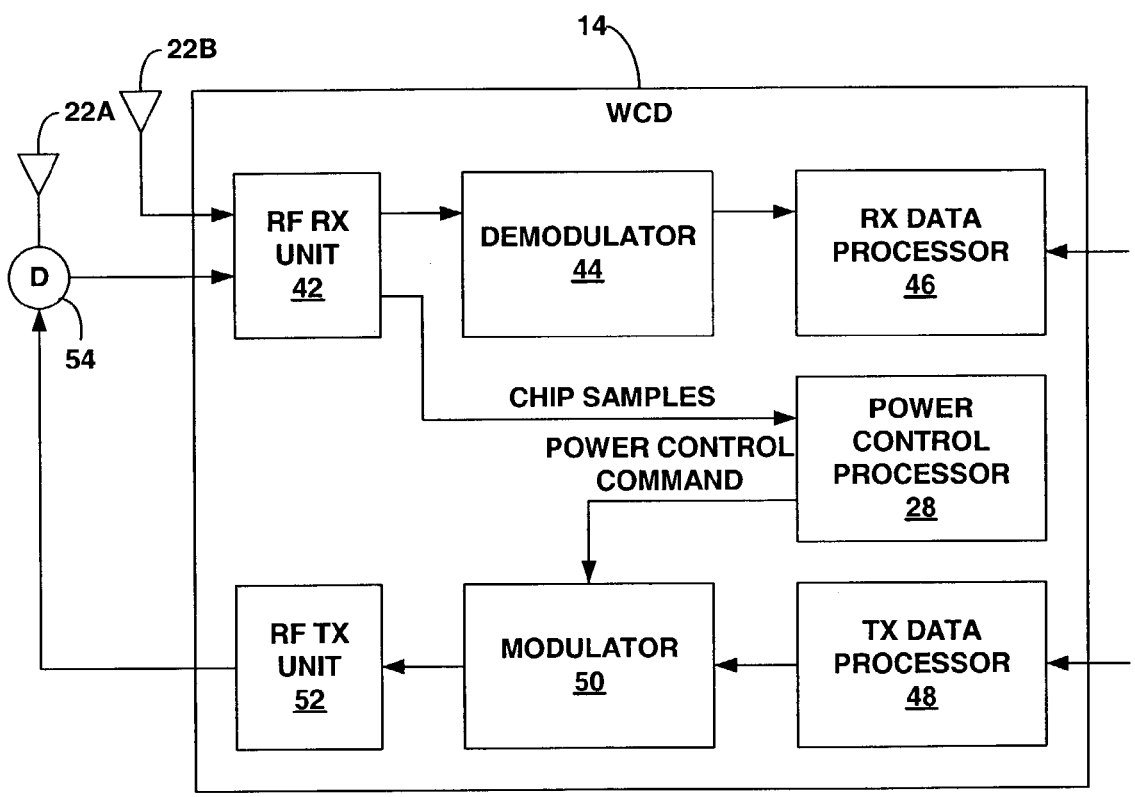
FIG. 4 is a block diagram illustrating a wireless communication device incorporating a power control processor as shown in FIG. 3.

FIG. 4 is a block diagram illustrating a WCD 14 incorporating a power control processor 28 as shown in FIG. 3. As shown in FIG. 4, WCD 14 generally includes a radio frequency receive (RF RX) unit 42, a demodulator 44, and a receive (RX) data processor 46. In addition, WCD 14 includes a transmit (TX) data processor 48, a modulator 50 and a radio frequency transmit (RF TX) unit 52. RF RX unit 42 obtains spatial samples of wireless signals via antennas 22A, 22B and provides the samples to demodulator 44. Demodulator 44 demodulates the spatial samples into traffic and pilot symbols for processing by RX data processor 46.

Power control processor 28 receives antenna chip samples from RF RX unit 42, and generates chip estimates for the received signal based on the spatial chip samples. In addition, power control processor 28 generates traffic and pilot symbol estimates for the received signal based on the spatial chip samples. Using the chip estimates and the traffic and pilot symbol estimates, power control processor 28 formulates a spatial projection wiener filter function. As will be described in further detail, formulation of the spatial projection wiener filter function may involve performing a linear minimum mean square error estimation of the received signal based on the traffic and pilot symbol estimates and the chip estimate. Power control processor 28 formulates the spatial projection wiener filter function based on the linear minimum mean square error estimation.

Power control processor 28 scales the traffic and pilot symbol estimates using the spatial projection wiener filter function, and estimates SNR based on the scaled traffic and pilot symbol estimates. Based on the estimated SNR, power control processor 28 generates a power control command and passes the command to modulator 50 for modulation and transmission via RF TX unit 52, duplexer 54 and antenna 22A. Although RF TX unit 52 is shown as transmitting via one of antennas 22A, 22B in the example of FIG. 4, the RF TX unit may transmit via both antennas. Modulator 50 also modulates data provided by TX data processor 48 for transmission to base station 12. Upon receipt of the power control command, base station 12 adjusts its transmit power.

Figure 5:
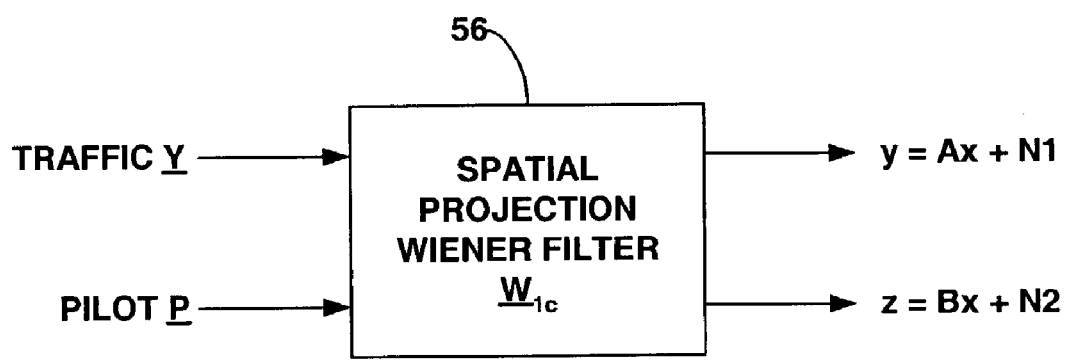
FIG. 5 is a block diagram illustrating use of a spatial projection wiener filter function to scale traffic and pilot symbol estimates.

FIG. 5 is a block diagram illustrating use of a spatial projection Wiener filter function to scale traffic and pilot symbol estimates. As shown in FIG. 5, a spatial projection wiener filter (SPWF) 56 serves to fold the desired SNR estimate into the received signal amplitude, thereby transforming the classic SNR estimation into that of a signal amplitude estimation problem. In particular, SPWF 56 applies a function W1c that converts traffic symbols $\underline{Y}$ and pilot symbols $\underline{P}$ to y and z, respectively, as follows:

$y = Ax + N_1$ Traffic Projection on Spatial Projection Wiener Filter $z = B + N_2$ Pilot Projection on Spatial Projection Wiener Filter where x represents a complex data symbol, A represents channel gain on the traffic channel, B represents channel gain on the pilot channel, $N_1$ represents traffic channel noise, and $N_2$ represents pilot channel noise.

The operation of power control processor 28, and particularly RX SNR estimator 34, will now be described in further detail. The various calculations described herein may be executed within RX SNR estimator 34 by hardware components, programmable features, or both. RX SNR estimator 34 may be implemented within individual finger processors of a RAKE receiver (not shown) provided within WCD 14 that includes multiple finger processors for tracking various propagations of multipath signals. In the following discussion, various parameters are generally defined as follows:

x=Data complex symbol received via antennas 22A, 22B

$I_{or}$=Total received power spectral density (PSD) per antenna 22A, 22B

L=Number of paths in multipath 18

$g_k$=k-th path gain along a respective path of multipath 18

$\underline{f}$=Fade vector (complex) on two antennas 22A, 22B

$I_{oc}$=noise from other cells in system 10

$W_k$=Complex noise N (0,1)

$\underline{W}$=Complex vector Additive White Gaussian Noise (AWGN) N (0,1) uncorrelated NIP (k)=for RAKE receiver, k-th finger noise plus interference for pilot channel NIT (k)=for RAKE receiver, k-th finger noise plus interference for traffic channel $N_p$, N=Pilot and traffic processing gain $E_p$, $E_d$=Pilot and traffic energy per chip Given spatial samples of the pilot and traffic channel samples $P_i$ and $Y_i$, RX SNR estimator 34 estimates a corresponding data symbol as a linear minimum mean square estimation (LMMSE) and performs a symbol level combining formulation. Chip level signals at the two receive antennas 22A, 22B can be represented as:

$$\underline{Y}_c = \sqrt{I_{or}} \sum_{k=1}^{L} g_k \underline{f}(k) W_k(0,1) + \sqrt{I_{or}} \underline{W}(0,1)$$

where the first term $N(I_{or})$ represents the random-random sum of power of all transmitted chips. W(0,1) is the same for two antennas in this example. The symbol level signals at the two receive antennas 22A, 22B can be represented as:

Pilot channel: $\underline{P} = N_p \sqrt{E^p} g_k \underline{f}(k) + \underline{NIP}(k)$      k-th Finger Traffic channel: $\underline{Y} = N \sqrt{E^d} g_k \underline{f}(k) + \underline{NIT}(k)$      k-th Finger Using the symbol level signals, RX SNR estimator 34 computes an LMMSE solution (single path) as follows:

$$\underline{Y} = \underline{X} + \underline{NI} = N\sqrt{E^d}\underline{f}x + \underline{NI}$$

$$\hat{x} = \underline{W}^H \underline{Y}$$

$$\underline{W} = R_{yy}^{-1} R_{xy}$$

The chip level received signal strength $R_{cyy}$ (single path) can be represented as:

$$R_{cyy} = I_{or}\underline{f}\underline{f}^H + R_{cnn} \quad (5)$$

The symbol level received signal strength $R_{yy}$ (single path) can be represented as:

$$R_{syy} = N^2 E^d \underline{f}\underline{f}^H + R_{snn} \quad (6)$$

In this case, the chip level and symbol level parameters have the following relationships:

$$R_{snn} = NR_{cnn}$$

$$R_{syy} = NR_{cyy} \text{ for } NE^d = I_{or} \quad (7)$$

particularly at high data rate (HDR), making chip-level processing attractive. The corresponding complex vector coefficient $\underline{W}$ may be expressed as:

$$\underline{W}_{cy} = \frac{N_p\sqrt{E^p} R_{cnn}^{-1} \underline{f}}{1 + I_{or}\alpha_c} = \frac{N_p\sqrt{E^p} R_{cnn}^{-1} \underline{f}}{\beta}, \quad (8)$$

$$\alpha_c = \langle R_{cnn}^{-1}\underline{f}, \underline{f}\rangle = \|\underline{f}\|_{cn} \text{ Weighted norm}$$

$$\underline{W}_{sy} = \frac{N_p\sqrt{E^p} R_{snn}^{-1} \underline{f}}{1 + N^2 E^d \alpha_s}, \quad \alpha_s = \langle R_{snn}^{-1}\underline{f}, \underline{f}\rangle = \|\underline{f}\|_{sn} \text{ Weighted norm} \quad (9)$$

where $\underline{W}_{cy}$ and $\underline{W}_{sy}$ are chip and symbol level results, respectively.

The normalized $\underline{W}$; $\underline{W}_1$ [1] is represented as:

$$\underline{W}_{cy} = \frac{1}{1 + I_{or}\alpha_c}\underline{W}_{cn}, \text{ so } (1 + I_{or}\alpha_c) = \frac{\|\underline{W}_{cn}\|}{\|\underline{W}_{cy}\|} = \beta = \frac{N\|\underline{W}_{sn}\|}{\|\underline{W}_{cy}\|} \quad (15)$$

$$\underline{W}_1 = W_{cy}\frac{\|\underline{W}_{cn}\|}{\|\underline{W}_{cy}\|}$$

$$= \frac{N_p\sqrt{E^p} R_{cnn}^{-1} \underline{f}}{1 + I_{or}\alpha_c}(1 + I_{or}\alpha_c)$$

$$= N_p\sqrt{E^p} R_{cnn}^{-1} \underline{f}$$

$$= \frac{N_p\sqrt{E^p} R_{snn}^{-1} \underline{f}}{N}$$

In the above expression, RX SNR estimator 34 eliminates $\beta$ in the denominator of $\underline{W}_{cy}$. As shown above, RX SNR estimator 34 can compute $\underline{W}_1$ from $\underline{W}_{sn}$ where the difference is a processing gain scaling. New scaled channels at the output of the spatial 2-tap causal FIR Wiener filter 56 are as follows:

Traffic: $y = \underline{W}^H \underline{Y} = N_p N\sqrt{E^p E^d}\alpha_c x + \text{noise}(N_1)$ (16)

Pilot: $z = \underline{W}_1^H \underline{P} = N_p^2 E^p \alpha_c + \text{noise}(N_2)$ (17)

where $N_1$ and $N_2$ are complex noise processes.

Again, spatial projection Wiener filter spectral shaping by RX SNR estimator 34 serves to fold the desired SNR into the signal amplitude, thereby transforming the classic SNR estimation into that of a signal amplitude estimation problem. Spatial Projection Wiener filter 56 serves to convert traffic $\underline{Y}$ and $\underline{P}$ to y and z, respectively, as follows:

$$y = Ax + N_1$$

$$z = B + N_2,$$

where $$A = N_p N\sqrt{E^p E^d}\alpha_c \quad (18)$$

$$B = N_p^2 E^p \alpha_c \quad (19)$$

In this case, the following relationship holds:

$$C = \frac{|Ax|^2}{B} = \frac{A^2}{B} = N^2 E^d \alpha_c = NE^b \alpha_c = \text{desired } SNR \quad (20)$$

As a result, RX SNR estimator 34 can determine the signal-to-noise ratio by estimating C in the presence of noise. The estimate of C may be accomplished more readily, however, by independent estimation of A and B. Note that:

$$\frac{|Ax|^2}{B} = N^2 E^d \alpha_c = NE^b \alpha_c = N\frac{E_b}{N_t} \text{ (scaled by } N)$$

To solve the estimation problem, it is necessary to estimate A and B. Given the following post spatial Weiner filter scalar traffic and pilot channels:

$$y_i' = Ax + N_{1i}$$

$$z_i' = B + N_{2i} \quad (21)$$

$$y_i = \text{Real}\{y_i'\} \text{ and } z_i = \text{Real}\{z_i'\}$$

RX SNR estimator 34 estimates the values of A and B and thus $$\frac{A^2}{B}.$$

The basic estimator will treat the QPSK x as two independent BPSK channels, and therefore operates on I and Q separately. Letting $y_i = \text{Real}\{y_i'\}$ and $z_i = \text{Real}\{z_i'\}$, note that A and B vary with time also because they involve fade.

$$\text{est}\frac{E_b}{N_t} = \frac{f(|y|)^2}{f(|z|)}$$

per finger and sum across fingers.

To solve the problem within Maximum Likelihood Framework, letting z denote the pilot channel, and y denote the Wiener filter output traffic sequence, and 1(A, B|x) denote the conditional likelihood, it follows that:

$$1(A, B|x) = p(\underline{y}, \underline{z}|A, B, x)$$

$$= \text{constant } e^{-\sum_{i=1}^{K} \frac{(y_i^2 - Ax_i)^2}{2\sigma^2}} e^{-\sum_{i=1}^{K} \frac{(z_i - B)^2}{2\sigma^2}}$$

where $\sigma^2 = \underline{W}_1^H R_{snn} \underline{W}_1$ is the power of the noise and K is the number of observation samples at the symbol rate. The unconditional log likelihood then can be represented, independent of x, as follows:

$$\Lambda(A, B) = \ln\{E_x[1(A, B|x)]\}$$

$$= \frac{-K(A^2 + B^2)}{2\sigma^2} + \frac{b \sum_i z_i}{\sigma^2} + \sum_i \ln\left(\cosh\left[\frac{a y_i}{\sigma^2}\right]\right)$$

where x is treated as BPSK. QPSK is treated as two independent BPSK channels. The following approximation is used to solve the problem:

$$\ln\left(\cosh\left[\frac{a y_i}{\sigma^2}\right]\right) \approx \frac{a|y_i|}{\sigma^2}$$

The approximate unconditional log likelihood can then be represented as:

$$\Lambda(A, B) \approx \frac{-K(A^2 + B^2)}{2\sigma^2} + \frac{b \Sigma z_i}{\sigma^2} + \frac{\Sigma a|y_i|}{\sigma^2} \quad (23)$$

Optimizing the above equation (23) results in the (suboptimum) maximum likelihood estimates of A and B:

$$\hat{A}_{ML} = \frac{\sum^K |y_i|}{K} \text{ and } \hat{B}_{ML} = \frac{\sum^K z_i}{K}$$

where K represents the bits in the power control group.

Having found $\hat{A}$ and $\hat{B}$, then: estimated $$\frac{E_b}{N_t} = \frac{1}{N} \frac{\hat{A}^2}{\hat{B}}$$

From equation (21) above, $y_i = \text{Real }\{y_i'\}$ and $z_i = \text{Real }\{z_i'\}$. In this case, approximation is in the first order. Higher order will improve performance, requiring $\sigma^2$.

Figure 6:
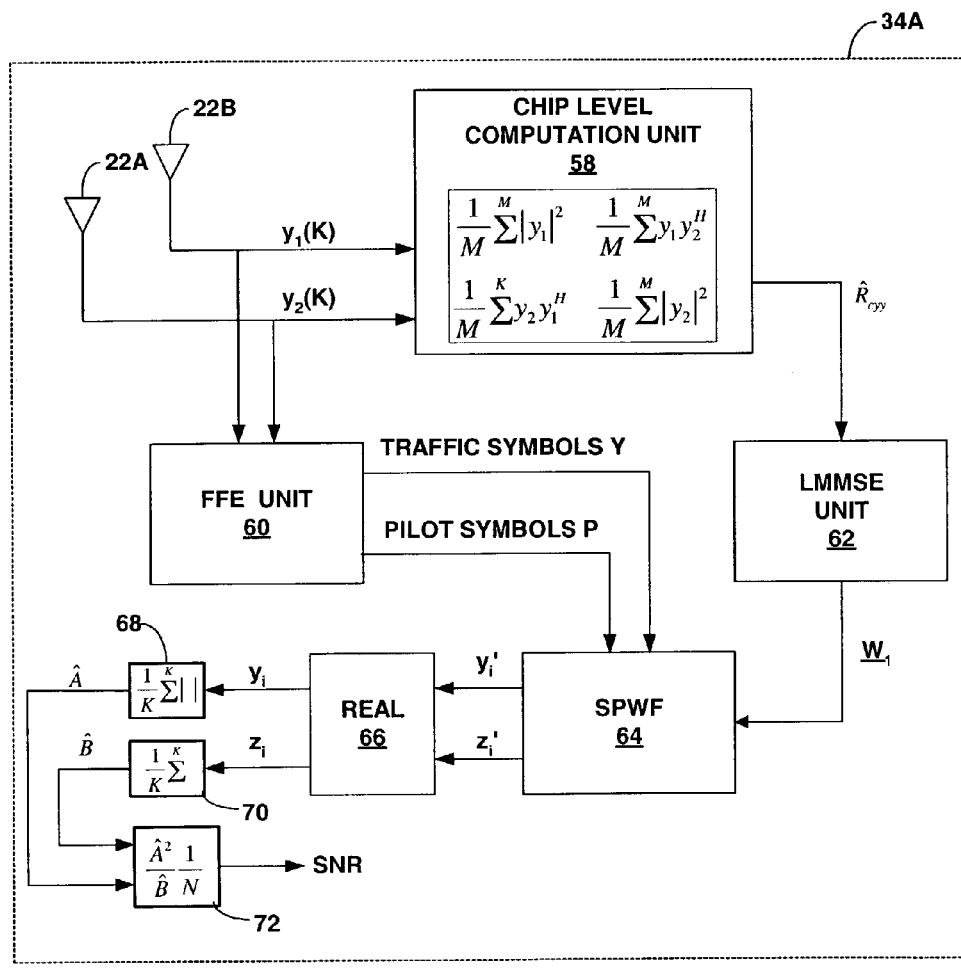
FIG. 6 is a block diagram illustrating a signal-to-noise ratio estimator for incorporation in a wireless communication device as shown in FIG. 4.

FIG. 6 is a block diagram illustrating an exemplary RX SNR estimator 34A in greater detail. FIG. 6 represents a BPSK conceptual example for purposes of illustration. RX SNR estimator 34A may be incorporated in a finger processor of a RAKE receiver in a WCD 14 as shown in FIG. 4. Accordingly, WCD 14 may include a RAKE receiver with multiple finger processors and, hence, multiple instances of RX SNR estimator 34, i.e., one for each finger processor. As shown in FIG. 6, RX SNR estimator 34A includes a chip level computation unit 58, a finger front end (FFE) unit 60, an LMMSE unit 62, a spatial projection wiener filter (SPWF) unit 64, a real transform unit 66, a traffic summation unit 68, a pilot summation unit 70, and an SNR calculation unit 72.

In the example of FIG. 6, chip level computation unit 58 processes received signals $y_1$ and $y_2$ from antennas 22A, 22B for a respective RAKE receiver finger K, and produces a chip level estimate of received signal strength $\hat{R}_{cyy}$. FFE unit 60 processes received signals $y_1$ and $y_2$ to produce traffic and pilot symbol estimates Y and P, respectively. LMMSE unit 62 processes the chip level estimate $\hat{R}_{cyy}$ to formulate Wiener filter coefficients $\underline{W}_1$.

There are essentially two choices in producing multiplath estimates. As a first example, we can estimate for the individual paths and then combined the results. Alternatively, we can combine the individual paths first and then produce an estimate for the combined results. Both approaches are contemplated herein. If each antenna 22A, 22B has L resolvable paths (L fingers), then there are L associated Spatial projection wiener Filters (SPWF) with coefficients W1(1) . . . W1(L) as shown below:

$$\underline{W}_1(k) = N_p \sqrt{E^p} R_{cnn}^{-1}(k) \underline{f}(k) \quad (24)$$

where, as indicated in equation (7), $$R_{cnn}^{-1}(k) = N R_{snn}^{-1}(k) \text{ k-th path correlation}$$

$$\underline{f}(k) \text{ k-th path fade}$$

Upon computation of SPWF coefficients $\underline{W}_1$ by LMMSE unit 62, the resulting SPWF 64 for finger K output to traffic and pilot channels Y and P becomes:

$$y(k) = \underline{W}_1^H(k) \underline{Y}(k) = N N_p \sqrt{E^p E^d} \alpha_c(k) + \underline{W}_1^H(k) \text{ noise } (k)$$

$$z(k) = \underline{W}_1^H(k) \underline{Y}(k) = N_p^2 E^p \alpha_c(k) + \underline{W}_1^H(k) \text{ noise } (k)$$

where $\alpha_c(k) = \underline{f}^H R_{cnn}^{-1}(k) \underline{f}(k)$ is the k-finger fade weighted norm With further reference to FIG. 6, SPWF 64 applies a spatial projection wiener filter function to traffic symbols Y and pilot symbols P according to the SPWF coefficient $\underline{W}_1$ produced by LMMSE unit 62, and thereby produces filtered outputs $y_i'$ and $z_i'$. If y' and z' denote the SPWF output for all combined fingers in the RAKE receiver at the output of SPWF 64, then:

$$y' = N N_p \sqrt{E^p E^d} x \left[\sum_{k=1}^{L} (\alpha_c(k) + \underline{W}_1^H(k) \text{ noise}(k))\right] \quad (25)$$

$$= Ax + \text{noise}$$

$$z' = N_p^2 E^p \left[\sum_{k=1}^{L} (\alpha_c(k) + \underline{W}_1^H(k) \text{ noise }(k))\right] = B + \text{noise}$$

The resulting combined signal-to-noise ratio can be represented as:

$$\text{Combined } SNR = \frac{N^2 N_p^2 E^p E^d \left(\overset{L}{\Sigma} \alpha_c(k)\right)^2}{N_p^2 E^p \left(\overset{L}{\Sigma} \underline{f}^H(k) R_{cnn}^{-1}(k) R_{snn}(k) R_{cnn}^{-1}(k) \underline{f}\right)} \quad (26)$$

$$= \frac{N^2 E^d \left(\overset{L}{\Sigma} \alpha_c(k)\right)^2}{N \overset{L}{\Sigma} \underline{f}(k) R_{snn}^{-1}(k) R_{snn}(k) R_{cnn}^{-1}(k) \underline{f}(k)}$$

$$= \frac{N^2 E^d (\Sigma \alpha_c(k))^2}{N(\Sigma \alpha_c(k))}$$

$$= N E^d \Sigma \alpha_c(k) = E^b \left(\overset{L}{\Sigma} \alpha_c(k)\right)$$

Combined(total fingers)SNR

If A and B denote the combined envelope of traffic and pilot channel y and z, then $$A = \Sigma A(k) = N N_p \sqrt{E^p E^d} \left(\overset{L}{\Sigma} \alpha_c(k)\right)$$

$$B = \Sigma B(k) = N_p^2 E^p \left(\overset{L}{\Sigma} \alpha_c(k)\right)$$

Accordingly, it can be seen that:

$$C = \frac{A^2}{B} = E^b(\Sigma \alpha_c(k)) = \text{desired finger combined } SNR$$

We can now estimate A and B. This would represent the combining followed by the estimation architecture. Therefore, the same principle of SPWF output envelope estimation also holds for the multifinger case.

Alternatively, assuming that the paths are more than 1.5 chip away from one another, they are statistically independent and joint ML estimation of $A_1, A_2, \ldots A_L$ results in marginal unconditional likelihoods, $$L(A_k, B_k) = \ln[E_x]\{p(x, z | A_k, B_x)\}$$

where $A_k$ and $B_k$ are finger k SPWF output noiseless envelopes. Solving the individual likelihood as in the single path results in:

$$\hat{A}(k) = \frac{\overset{K}{\Sigma} |y_k(l)|}{K}, \quad y_k(l) = \text{Real}(y_k'(l))$$

$$\hat{B}(k) = \frac{\overset{K}{\Sigma} z_k(l)}{K}, \quad z_k(l) = \text{Real}(z_k'(l))$$

The above computation can be realized by real transformation unit 66, and summation units 68, 70, as shown in FIG. 6. The combined maximum likelihood (ML) estimate of the signal-to-noise ratio is then:

$$\text{estimated } \frac{E_b}{N_t} = \frac{\left(\sum_{l=1}^{L} \hat{A}(l)\right)^2}{\sum_{l=1}^{L} \hat{B}(l)}$$

as achieved by SNR computation unit 72 in FIG. 6. Under correlated multipath interference, to avoid overestimation, a sum of squares can be used rather than a square of the sum for A as shown in FIG. 8. Note that this represents the approach by which the individual paths are estimated first, and then the result is combined. Alternatively, we can combine the paths first, and then produce an estimate for the combined result as shown in FIG. 7 for QPSK.

Figure 7:
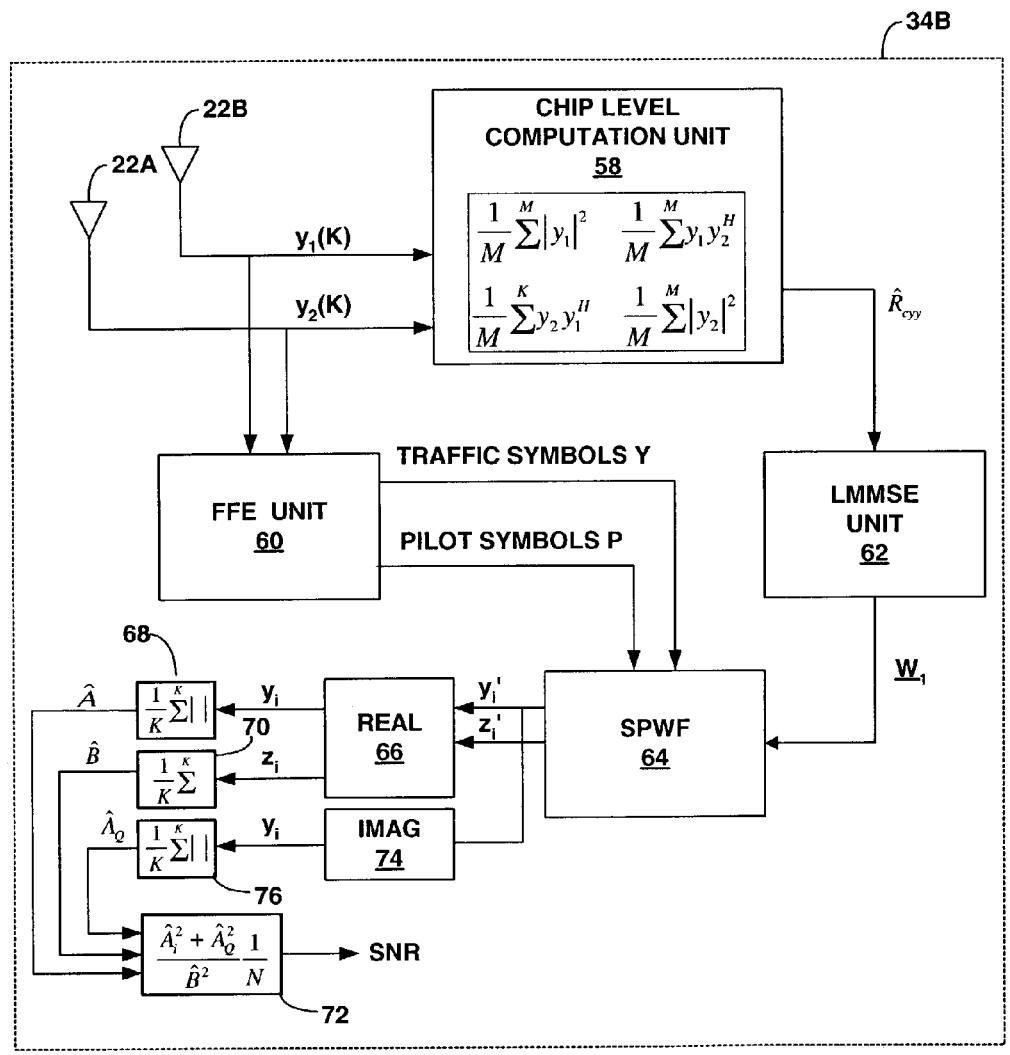
FIG. 7 is a block diagram illustrating another signal-to-noise ratio estimator for incorporation in a wireless communication device as shown in FIG. 4.
Figure 8:
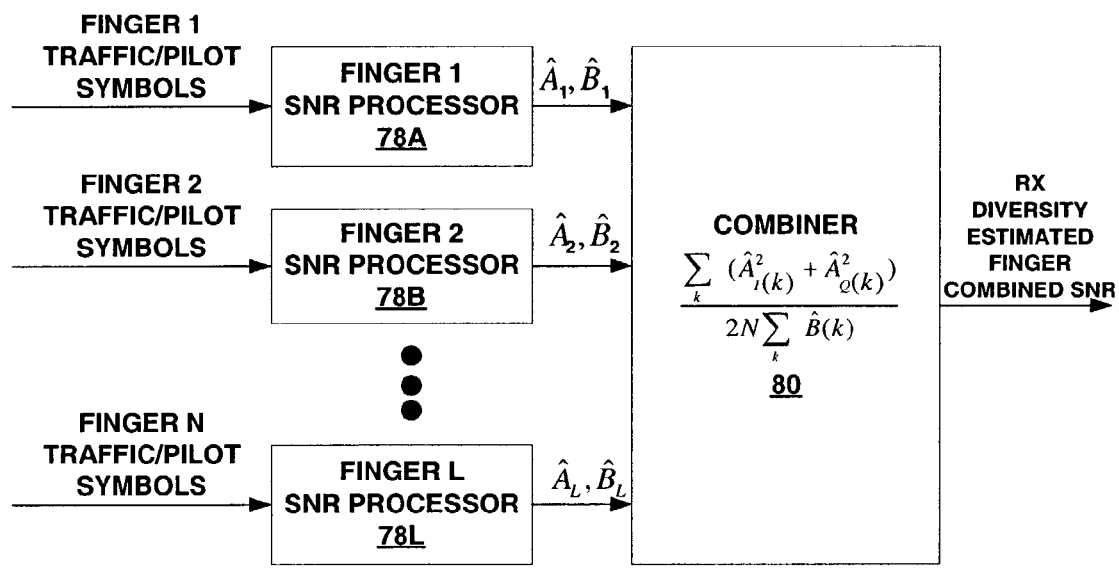
FIG. 8 is a block diagram illustrating a multi-finger signal-to-noise ratio estimator for a RAKE receiver.

FIG. 7 is a block diagram illustrating another RX SNR estimator 34B for incorporation in WCD 14 as shown in FIG. 4. In the example of FIG. 7, multiple paths are combined first, and then estimates are produced for the combined result. RX SNR estimator 34B conforms substantially to RX SNR estimator 34A of FIG. 6, but is configured for QPSK rather than BPSK. To that end, RX SNR estimator 34B further includes an imaginary transformation unit 74 to produce an imaginary component of $y_i'$, as well as an imaginary component summation unit 76 to produce $\hat{A}_Q$. In this case, SNR computation unit 72 is modified to estimate Eb/Nt according the following expression:

$$\frac{\hat{A}_I^2 + \hat{A}_Q^2}{B^2} \frac{1}{N},$$

where $\hat{A}_Q$ is produced by imaginary transformation unit 74 and summation unit 76.

FIG. 8 is a block diagram illustrating a multi-finger SNR estimator for a RAKE receiver in a WCD 14. FIG. 8 illustrates an approach is which the SNR estimate is made prior to combining finger outputs. As an alternative, however, SNR estimation could be carried out following combination of the finger outputs, as shown in the example of FIG. 7. As shown in FIG. 8, the multi-finger SNR estimator includes a plurality of finger SNR processors 78$_A$-78$_L$ for the L resolvable paths presented by antennas 22A, 22B. A combiner 80 produces a combined receive diversity estimated SNR (Eb/Nt) according to the expression:

$$\frac{1}{N} \frac{\left(\sum \hat{A}_k^2\right)}{\left(\sum \hat{B}_k\right)}$$

Power control processor 28 can use the combined SNR estimate to generate an appropriate power control command for base station 12.

Figure 9:
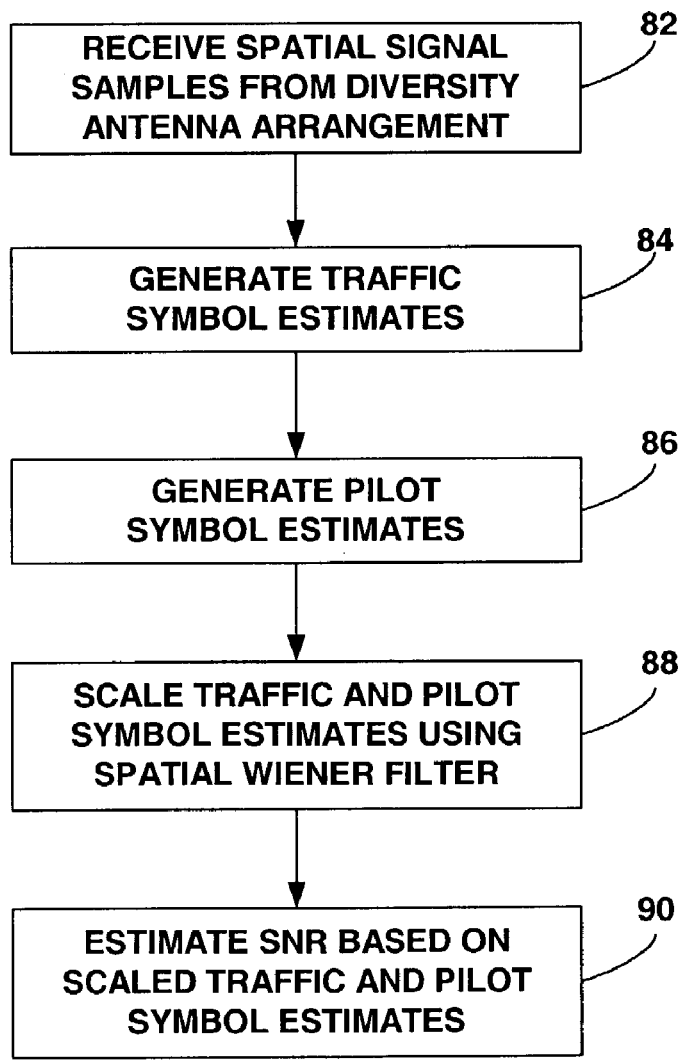
FIG. 9 is a flow diagram illustrating a technique for estimation of signal-to-noise ratio using receive diversity.

FIG. 9 is a flow diagram illustrating a technique for estimation of SNR using receive diversity. The SNR estimation technique may be implemented within power control processor 28 and generally conforms to the computations described herein. In general, the technique may involve receiving spatial signal samples from a diversity antenna arrangement (82), generating traffic symbol estimates (84), and generating pilot symbol estimates (86). The technique further involves scaling the traffic and pilot symbol estimates using a spatial projection wiener filter function (88), and then estimating the SNR based on the scaled traffic and pilot symbol estimates (90).

Figure 10:
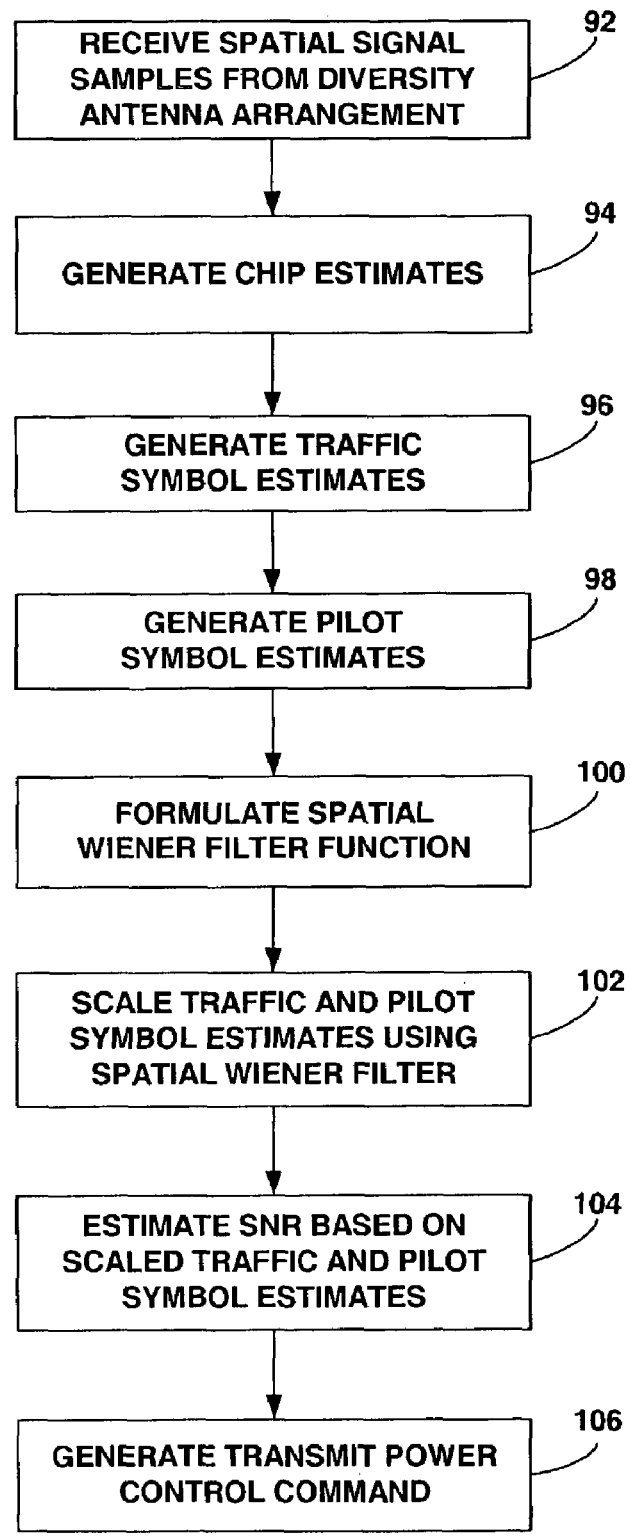
FIG. 10 is a flow diagram illustrating the technique of FIG. 9 in greater detail.

FIG. 10 is a flow diagram illustrating the technique of FIG. 9 in greater detail. As shown in FIG. 10, the SNR estimation technique may involve receiving spatial signal samples from a diversity antenna arrangement (92), generating chip-level estimates based on the spatial samples (94), generating traffic symbol estimates (84), and generating pilot symbol estimates (86). In addition, the SNR estimation technique may involve computing a coefficient vector to formulate a spatial projection wiener filter function (100), and scaling the traffic and pilot symbol estimates using the spatial projection wiener filter function (102). Upon estimation of the SNR based on the scaled traffic and pilot symbol estimates (104), the technique may further involve the generation of a power control command (106).

Although this disclosure has described the SNR estimation techniques in the context of receive diversity, similar techniques may be implemented without receive diversity. In some embodiments, for example, the techniques may involve generation of generating traffic and pilot symbol estimates for a wireless signal received via a single receive antenna, followed by scaling of traffic and pilot symbol estimates using a spatial projection wiener filter function as described herein. In this case, the spatial projection wiener filter function may be used for SNR estimation in single-antenna or receive diversity antenna arrangements.

If any the techniques described herein, or portions of such techniques, are implemented in software, a computer-readable medium may store computer readable instructions, i.e., program code, that can be executed by a processor or DSP to carry out one of more of the techniques described above. For example, the computer readable medium may comprise random access memory (RAM), read-only memory (ROM), non-volatile random access memory (NVRAM), electrically erasable programmable read-only memory (EEPROM), flash memory, magnetic or optical media, or the like. Hence, the computer readable medium may comprise computer readable instructions that when executed in a WCD, cause the WCD to carry out one or more of the techniques described herein.

Various embodiments have been described. These and other embodiments are within the scope of the following claims.

The invention claimed is:

1. A method comprising:
generating traffic and pilot symbol estimates for a received wireless signal based on spatial samples of the signal;
scaling the traffic and pilot symbol estimates using a spatial projection wiener filter function;
estimating a signal-to-noise ratio based on the scaled traffic and pilot symbol estimates;
generating a power control command based on the estimated signal-to-noise ratio; and
transmitting the power control command to request adjustment of a transmit power.

2. The method of claim 1, further comprising:
obtaining a plurality of spatial chip samples for the received wireless signal;
generating a chip estimate of the received signal based on the spatial chip samples;
generating the traffic and pilot symbol estimates for the received signal based on the spatial chip samples; and
formulating the spatial projection wiener filter function based on the chip estimate and the traffic and pilot symbol estimates.

3. The method of claim 2, wherein formulating the spatial projection wiener filter function includes performing a linear minimum mean square error estimation of the received signal based on the traffic and pilot symbol estimates and the chip estimate of the received signal, and formulating the spatial projection wiener filter function based on the linear minimum mean square error estimation.

4. The method of claim 1, further comprising applying the power control command in forward power control inner loop in a code division multiple access (CDMA) communication network.

5. The method of claim 1, wherein the received signal is a code division multiple access (CDMA) signal.

6. The method of claim 1, wherein the scaled traffic symbol is represented by $y = Ax + N_1$, the scaled pilot symbol estimate is represented by $z = B + N_2$, and estimating the signal-to-noise ratio includes estimating the signal-to-noise ratio based on a value of $A^2/B$, wherein A represents a channel gain for the traffic symbol, B represents a channel gain for the pilot symbol, $N_1$ represents noise for the traffic symbol, and $N_2$ represents noise for the pilot symbol.

7. The method of claim 1, wherein estimating a signal-to-noise ratio includes estimating a value of $E_b/N_t$ based on the scaled traffic and pilot symbol estimates, wherein $E_b$ represents signal energy per information-bit and $N_t$ represents noise power spectral density.

8. The method of claim 1, further comprising generating traffic and pilot symbol estimates processed via a plurality of RAKE receiver fingers.

9. A wireless communication device, comprising:
means for generating traffic and pilot symbol estimates for a received wireless signal based on spatial samples of the signal;
means for scaling the traffic and pilot symbol estimates using a spatial projection wiener filter function;
means for estimating a signal-to-noise ratio based on the scaled traffic and pilot symbol estimates;
means for generating a power control command based on the estimated signal-to-noise ratio; and
means for transmitting the power control command to request adjustment of a transmit power.

10. The device of claim 9, wherein the device further comprises:
means for obtaining a plurality of spatial chip samples for the received wireless signal;
means for generating a chip estimate of the received signal based on the spatial chip samples;
means for generating the traffic and pilot symbol estimates for the received signal based on the spatial chip samples; and
means for formulating the spatial projection wiener filter function based on the chip estimate and the traffic and pilot symbol estimates.

11. The device of claim 10, wherein the formulating means is configured to formulate the spatial projection wiener filter function by performing a linear minimum mean square error estimation of the received signal based on the traffic and pilot symbol estimates and the chip estimate of the received signal, and formulating the spatial projection wiener filter function based on the linear minimum mean square error estimation.

12. The device of claim 9, further comprising an applying means configured to apply the power control command in forward power control inner loop in a code division multiple access (CDMA) communication network.

13. The device of claim 9, wherein the received signal is a code division multiple access (CDMA) signal.

14. The device of claim 9, wherein the scaled traffic symbol is represented by $y=Ax+N_1$, the scaled pilot symbol estimate is represented by $z=B+N_2$, and the device is configured to estimate the signal-to-noise ratio by estimating the signal-to-noise ratio based on a value of $A^2/B$, wherein A represents a channel gain for the traffic symbol, B represents a channel gain for the pilot symbol, $N_1$ represents noise for the traffic symbol, and $N_2$ represents noise for the pilot symbol.

15. The device of claim 9, further comprising estimating means configured to estimate a signal-to-noise ratio by estimating a value of $E_b/N_t$ based on the scaled traffic and pilot symbol estimates, wherein $E_b$ represents signal energy per information-bit and $N_t$ represents noise power spectral density.

16. The device of claim 9, further comprising generating means configured to generate traffic and pilot symbol estimates processed via a plurality of RAKE receiver fingers.

17. A computer-readable medium comprising instructions to cause a processor to:
generate traffic and pilot symbol estimates for a received wireless signal based on spatial samples of the signal;
scale the traffic and pilot symbol estimates using a spatial projection wiener filter function; and
estimate a signal-to-noise ratio based on the scaled traffic and pilot symbol estimates,
wherein the instructions cause the processor to generate a power control command based on the estimated signal-to-noise ratio and the instructions cause the processor to transmit the power control command to request adjustment of a transmit power.

18. The computer-readable medium of claim 17, further comprising instructions to cause a processor to:
obtain a plurality of spatial chip samples for the received wireless signal;
generate a chip estimate of the received signal based on the spatial chip samples;
generate the traffic and pilot symbol estimates for the received signal based on the spatial chip samples; and
formulate the spatial projection wiener filter function based on the chip estimate and the traffic and pilot symbol estimates.

19. The computer-readable medium of claim 18, wherein the instructions cause the processor to formulate the spatial projection wiener filter function by performing a linear minimum mean square error estimation of the received signal based on the traffic and pilot symbol estimates and the chip estimate of the received signal, and formulating the spatial projection wiener filter function based on the linear minimum mean square error estimation.

20. The computer-readable medium of claim 17, wherein the instructions cause the processor to apply the power control command in a forward power control inner loop in a code division multiple access (CDMA) communication network.

21. The computer-readable medium of claim 17, wherein the received signal is a code division multiple access (CDMA) signal.

22. The computer-readable medium of claim 17, wherein the scaled traffic symbol is represented by $y=Ax+N_1$, the scaled pilot symbol estimate is represented by $z=B+N_2$, and wherein the instructions cause the processor to estimate the signal-to-noise ratio by estimating the signal-to-noise ratio based on a value of $A^2/B$, wherein A represents a channel gain for the traffic symbol, B represents a channel gain for the pilot symbol, $N_1$ represents noise for the traffic symbol, and $N_2$ represents noise for the pilot symbol.

23. The computer-readable medium of claim 17, wherein the instructions cause the processor to estimate a signal-to-noise ratio includes estimating a value of $E_b/N_t$ based on the scaled traffic and pilot symbol estimates, wherein $E_b$ represents signal energy per information-bit and $N_t$ represents noise power spectral density.

24. The computer-readable medium of claim 17, wherein the instructions cause the processor to generate traffic and pilot symbol estimates processed via a plurality of RAKE receiver fingers.

25. A method comprising:
generating traffic and pilot symbol estimates for a received wireless signal;
scaling the traffic and pilot symbol estimates using a spatial projection wiener filter function;
estimating a signal-to-noise ratio based on the scaled traffic and pilot symbol estimates; and
generating a power control command based on the estimated signal-to-noise ratio; and
transmitting the power control command to request adjustment of a transmit power.

26. The method of claim 25, further comprising:
obtaining chip samples for the received wireless signal;
generating a chip estimate of the received signal based on the chip samples;
generating the traffic and pilot symbol estimates for the received signal based on the chip samples; and
formulating the spatial projection wiener filter function based on the chip estimate and the traffic and pilot symbol estimates.

27. The method of claim 26, wherein formulating the spatial projection wiener filter function includes performing a linear minimum mean square error estimation of the received signal based on the traffic and pilot symbol estimates and the chip estimate of the received signal, and formulating the spatial projection wiener filter function based on the linear minimum mean square error estimation.

28. A wireless communication device, comprises:
means for generating traffic and pilot symbol estimates for a received wireless signal;
means for scaling the traffic and pilot symbol estimates using a spatial projection wiener filter function;
means for estimating a signal-to-noise ratio based on the scaled traffic and pilot symbol estimates;
means for generating a power control command based on the estimated signal-to-noise ratio; and
means for transmitting the power control command to request adjustment of a transmit power.

29. The device of claim 28, wherein the device further comprises:
means for obtaining chip samples for the received wireless signal;
means for generating a chip estimate of the received signal based on the chip samples;
means for generating the traffic and pilot symbol estimates for the received signal based on the chip samples; and
means for formulating the spatial projection wiener filter function based on the chip estimate and the traffic and pilot symbol estimates.

30. The device of claim 29, wherein the formulating means is configured to formulate the spatial projection wiener filter function by performing a linear minimum mean square error estimation of the received signal based on the traffic and pilot symbol estimates and the chip estimate of the received signal, and formulating the spatial projection wiener filter function based on the linear minimum mean square error estimation.

31. A computer-readable medium comprising instructions to cause a processor to:
generate traffic and pilot symbol estimates for a received wireless signal;
scale the traffic and pilot symbol estimates using a spatial projection wiener filter function;
estimate a signal-to-noise ratio based on the scaled traffic and pilot symbol estimates;
generate a power control command based on the estimated signal-to-noise ratio; and
transmit the power control command to request adjustment of a transmit power.

32. The computer-readable medium of claim 31, further comprising instructions to cause a processor to:
obtain chip samples for the received wireless signal;
generate a chip estimate of the received signal based on the chip samples;
generate the traffic and pilot symbol estimates for the received signal based on the chip samples; and
formulate the spatial projection wiener filter function based on the chip estimate and the traffic and pilot symbol estimates.

33. The computer-readable medium of claim 32, further comprising instructions to cause a processor to formulate the spatial projection wiener filter function by performing a linear minimum mean square error estimation of the received signal based on the traffic and pilot symbol estimates and the chip estimate of the received signal, and formulating the spatial projection wiener filter function based on the liner minimum mean square error estimation.

34. A wireless communication device comprising:
a receive (RX) Signal to Noise Ratio (SNR) estimator unit configured to receive spatial samples of a received wireless signal and generate traffic and pilot symbol estimates, the RX SNR estimator unit further configured to scale the traffic and pilot symbol estimates using a spatial projection wiener filter function to an generate estimated a signal-to-noise ratio based on the scaled traffic and pilot symbol estimates;
a comparator configured to generate a power control command based on the estimated signal-to-noise ratio and transmit the power control command to request adjustment of a transmit power.

35. The device of claim 34, further comprising a power control processor including the RX SNR estimator unit and the comparator, the power control processor further configured to:
obtain a plurality of spatial chip samples for the received wireless signal;
generate a chip estimate of the received signal based on the spatial chip samples;
generate the traffic and pilot symbol estimates for the received signal based on the spatial chip samples; and
formulate the spatial projection wiener filter function based on the chip estimate and the traffic and pilot symbol estimates.

36. The device of claim 35, wherein the spatial projection wiener filter function is formulated by performing a linear minimum mean square error estimation of the received signal based on the traffic and pilot symbol estimates and the chip estimate of the received signal.

37. The device of claim 35, wherein the power control command is applied in a forward power control inner loop in a code division multiple access (CDMA) communication network.

38. The device of claim 34, wherein the received signal is a code division multiple access (CDMA) signal.

39. The device of claim 34, wherein the scaled traffic symbol is represented by $y=Ax+N_1$, the scaled pilot symbol estimate is represented by $z=B+N_2$, and wherein the signal-to-noise ratio is estimated by estimating the signal-to-noise ratio based on a value of $A^2/B$, wherein A represents a channel gain for the traffic symbol, B represents a channel gain for the pilot symbol, $N_1$ represents noise for the traffic symbol, and $N_2$ represents noise for the pilot symbol.

40. The device of claim 34, wherein the signal-to-noise ratio is estimated by estimating a value of $E_b/N_t$ based on the scaled traffic and pilot symbol estimates, wherein $E_b$ represents signal energy per information-bit and $N_t$ represents noise power spectral density.

41. The device of claim 34, wherein the RX SNR estimator unit further comprises a plurality of RAKE receiver fingers for generating traffic and pilot symbol estimates.

42. A wireless communication device comprising:
a receive (RX) Signal to Noise Ratio (SNR) estimator unit configured to receive a wireless signal and generate traffic and pilot symbol estimates, the RX SNR estimator unit further configured to scale the traffic and pilot symbol estimates using a spatial projection wiener filter function to generate an estimated a signal-to-noise ratio based on the scaled traffic and pilot symbol estimates;
a comparator configured to generate a power control command based on the estimated signal-to-noise ratio and transmit the power control command to request adjustment of a transmit power.

43. The device of claim 42, further comprising a power control processor including the RX SNR estimator unit and the comparator, the power control processor further configured to:
obtain chip samples for the received wireless signal;
generate a chip estimate of the received signal based on the chip samples;
generate the traffic and pilot symbol estimates for the received signal based on the chip samples; and
formulate the spatial projection wiener filter function based on the chip estimate and the traffic and pilot symbol estimates.

44. The device of claim 43, wherein the spatial projection wiener filter function is formulated by performing a linear minimum mean square error estimation of the received signal based on the traffic and pilot symbol estimates and the chip estimate of the received signal.

* * * * *